United States Patent [19]

Symons

[11] 4,300,777
[45] Nov. 17, 1981

[54] FLUID SEAL

[75] Inventor: James D. Symons, Southfield, Mich.

[73] Assignee: General Motors Corporation, Detroit, Mich.

[21] Appl. No.: 159,783

[22] Filed: Jun. 16, 1980

[51] Int. Cl.³ .............................................. F16J 15/32
[52] U.S. Cl. .................................... 277/153; 277/165; 277/134
[58] Field of Search ............... 277/152, 153, 165, 134, 277/188 R, 188 A, 207 R, 180

[56] References Cited

U.S. PATENT DOCUMENTS

| | | | |
|---|---|---|---|
| 2,804,324 | 8/1957 | Stallings | 277/153 |
| 3,495,843 | 2/1970 | Andersen et al. | 277/153 X |
| 3,801,114 | 4/1974 | Bentley | 277/134 |
| 3,970,321 | 7/1976 | Dechavanne | 277/165 X |

FOREIGN PATENT DOCUMENTS

| | | | |
|---|---|---|---|
| 1056960 | 2/1967 | United Kingdom | 277/188 A |
| 1094515 | 12/1967 | United Kingdom | 277/134 |
| 1258972 | 3/1961 | France | 277/152 |
| 1294041 | 4/1962 | France | 277/134 |

Primary Examiner—Robert S. Ward, Jr.
Attorney, Agent, or Firm—Donald F. Scherer

[57] ABSTRACT

A lip-type fluid seal for use with a rotating shaft has a molded seal portion having a cylindrical surface comprised of two elastomeric materials. These elastomeric materials have significantly different elastic modulus values and hardness values. The cylindrical surface on both of the elastomeric materials have an axial projection which are formed during the molding process. During rotation of the shaft, the axial projections deflect to a helical configuration and cooperate with the shaft to form a viscous shear pump. The lower modulus material has a greater helical attitude and therefore increasing pumping action.

2 Claims, 4 Drawing Figures

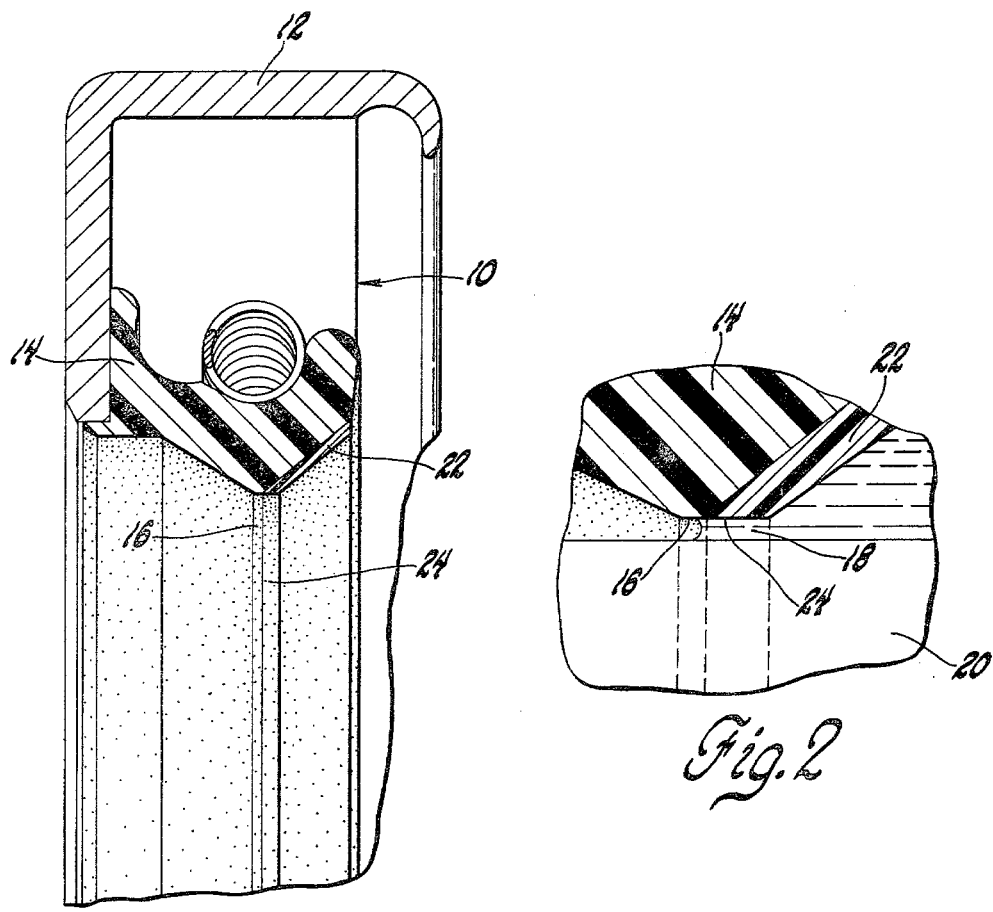
Fig.1
Fig.2
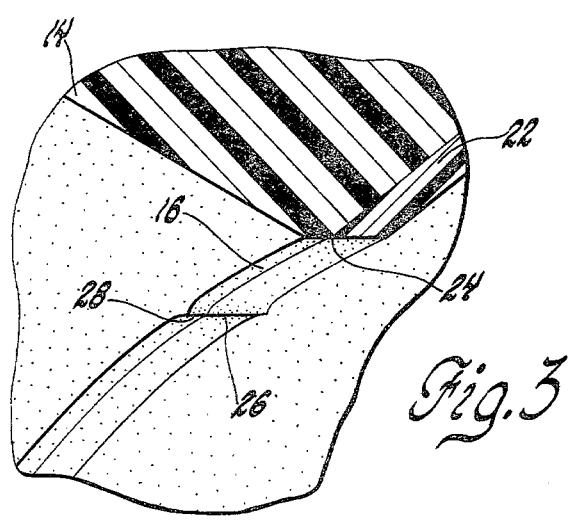
Fig.3
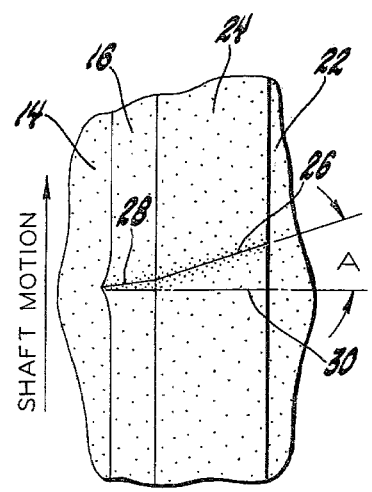
Fig.4

FLUID SEAL

This invention relates to fluid seals and more particularly to lip-type fluid seals for use with rotating shafts.

It is an object of this invention to provide an improved lip-type seal for a rotating shaft wherein a low modulus material is bonded to the liquid side of a conventional seal material to provide an increased viscous shear pump capacity for the seal.

It is another object of this invention to provide an improved lip-type seal for a rotating shaft wherein a thin, low modulus elastomeric material is bonded to a conventional seal material and wherein both seal materials include an axially extending wave portion which contacts the surface to be sealed, which wave portion is deformable to a helical configuration such that the low modulus material has a greater helical configuration and is more effective in generating a hydrodynamic force which opposes fluid leakage.

It is a further object of this invention to provide an improved lip-type seal having a low elastic modulus material bonded to the liquid side of the seal and including a normally axially disposed projection which will deflect into a helical configuration in the direction of shaft rotation and cooperate with the shaft to provide a viscous pumping action thereby retarding fluid leakage.

These and other objects and advantages of the present invention will be more apparent from the following description and drawings in which:

FIG. 1 is a cross-sectional view of a lip-type shaft seal;

FIG. 2 is an enlarged view of the sealing surface adjacent a shaft member;

FIG. 3 is an enlarged isometric view of a portion of the shaft seal; and

FIG. 4 is an enlarged view of a portion of the seal showing the deformation which occurs during operation.

Referring to the drawings, wherein like characters represent the same or corresponding parts throughout the several views, there is seen in FIG. 1 a lip-type shaft seal generally designated 10, having a cylindrical cup shaped metallic shell 12 to which is bonded an elastomeric member 14. The elastomeric member 14 has molded integrally therewith a cylindrical surface 16 which provides a sealing surface when a shaft is disposed adjacent thereto. As can be seen in FIG. 2, a fluid surface 18 is disposed between the surface 16 and a shaft member 20.

A thin layer of elastomeric material 22 is bonded to the elastomeric member 14. This elastomeric material 22 has a cylindrical sealing surface 24 which is adjacent the cylindrical surface 16. The material 14 preferably has a modulus of elasticity in the range of 800 to 2000 psi while the elastomeric material 22 has a modulus of elasticity range of 200 to 500 psi. Each material has a corresponding hardness range. It is also preferable that the materials 14 and 22 be molded at the same time in a single molding operation. It is possible however, to mold the material separately and later bond the material 22 to the material 14.

During the molding operation, a projection or wave 26 is formed in the cylindrical sealing surface 24 and a wave or projection 28 is formed in the cylindrical surface 16. Generally, during the molding operating, there will be two such waves or projections 26 and 28. However, if desired, more than two projections can be utilized. These projections 26 and 28 will occur during normal molding operation and special patterns do not have to be included in the mold. As is well-known in the art of seal making, special surface configurations have been formed in the molding operation to provide a hydrodynamic pumping action during seal operation.

The low modulus of elasticity material 22 is formed on the liquid side of the lip seal 10, as seen in FIG. 2. As seen in FIG. 4, the projections 28 and 26 will be deflected, from the axial direction 30, to a helical angle A. It is seen in FIG. 4 that the angle of deflection or helical inclination is in the direction of shaft motion. The angle of inclination between the projection 28 and the axial direction 30 is less than 1° while the angle of inclination between projection 26 and the axial direction 30 is generally between 2° and 3°. The fluid will impinge on the helical inclination and be forced toward the liquid side of the seal, thus improving the sealing characteristics by creating a viscous shear pumping action.

It should be noted that since the projections 26 and 28 deflect in the direction of shaft rotation, the viscous pumping action will be bi-directional so that special surface configurations do not have to be molded in the seal to accomplish this function. The higher modulus material, which may be a polyacrylate, provides improved seal life while the lower modulus material, which may be a urethane, permits increased helical inclination and therefore improved hydrodynamic pumping action at the interface between the shaft and seal. In place of the above materials, other materials such as silicones of varying moduli may be used.

It will be apparent from the above-description that an economical and effective bi-directional shaft seal is provided by the present invention.

The embodiments of the invention in which an exclusive property or privilege is claimed are defined as follows:

1. An improvement in fluid seals for a rotating shaft, said seal having an elastomeric material molded seal portion with a substantially cylindrical surface disposed sealingly circumjacent the shaft to provide an atmospheric side and a liquid side for sealing against axial liquid flow along said shaft, said improvement comprising; a second elastomeric material molded seal portion having a cylindrical surface disposed axially adjacent and bonded with the other cylindrical surface on the liquid side and sealingly circumjacent the shaft, said second seal portion having an elastic modulus substantially lower than the other seal portion and, each cylindrical surface having at least two normally axially extending projections which deflect to a helical configuration in the direction of and during shaft rotation, and said projections cooperating with the shaft to form a viscous shear pump with said projection on said second seal portion having greater helical configuration to increase the pumping action.

2. An improvement in fluid seals for a rotating shaft, said seal having an elastomeric material molded seal portion with a substantially cylindrical surface disposed sealingly circumjacent the shaft to provide an atmospheric side and a liquid side for sealing against axial liquid flow along said shaft, said improvement comprising; a second elastomeric material molded seal portion having a cylindrical surface disposed axially adjacent and bonded with the other cylindrical surface on the liquid side and sealingly circumjacent the shaft, said second seal portion having a modulus of elasticity and a hardness value both substantially lower than the other seal portion and, each cylindrical surface having at least two axially extending projections which deflect to a helical configuration as a result of shaft rotation, and said projections cooperating with the shaft to form a hydrodynamic pump with said projection on said second seal portion having greater helical configuration to increase the hydrodynamic pumping action.

* * * * *